Dec. 15, 1970  S. W. HINDS  3,547,740
PRESSURE SENSITIVE ADHESIVE TAPE APPLICATOR
Filed Dec. 3, 1968  2 Sheets-Sheet 1
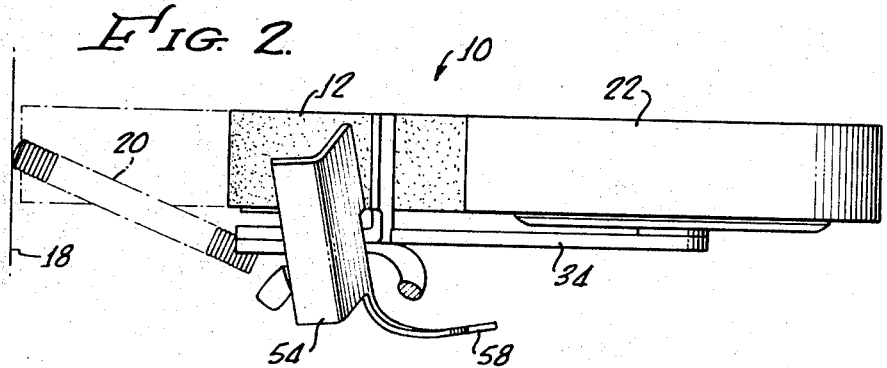
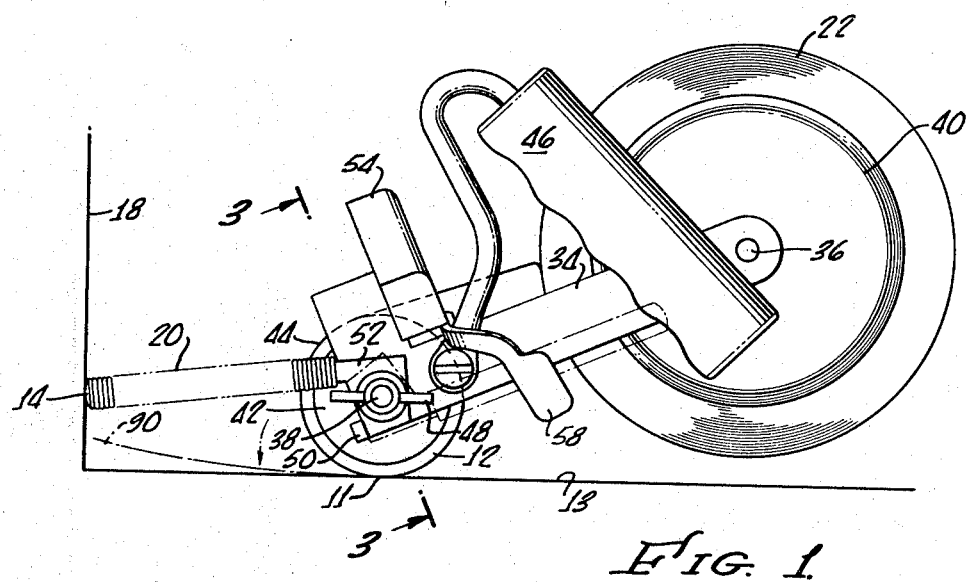
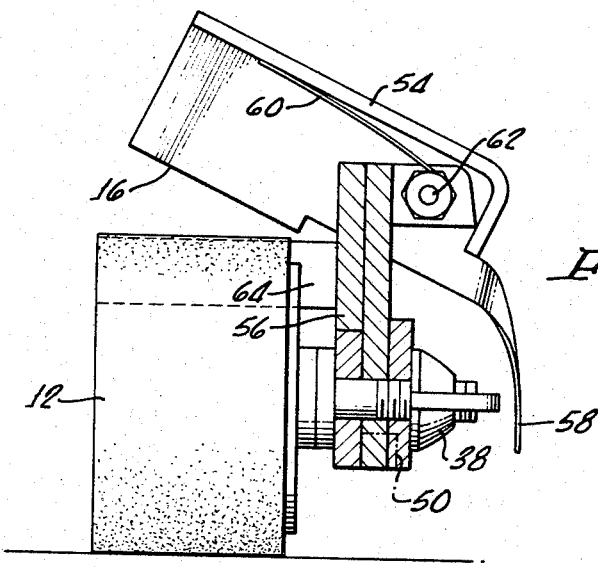
INVENTOR.
SCHUBERT W. HINDS
BY Donald W Canady
ATTORNEY.

Dec. 15, 1970  S. W. HINDS  3,547,740
PRESSURE SENSITIVE ADHESIVE TAPE APPLICATOR
Filed Dec. 3, 1968  2 Sheets-Sheet 2
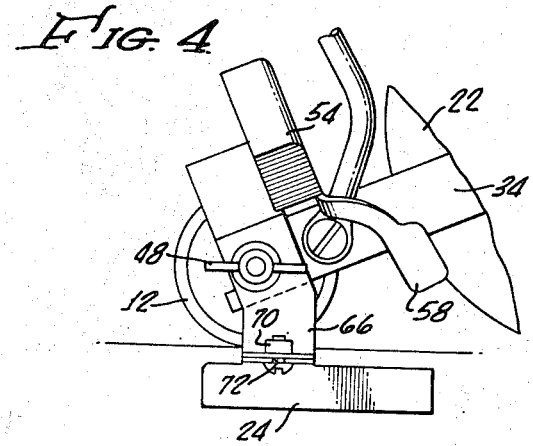
FIG. 4
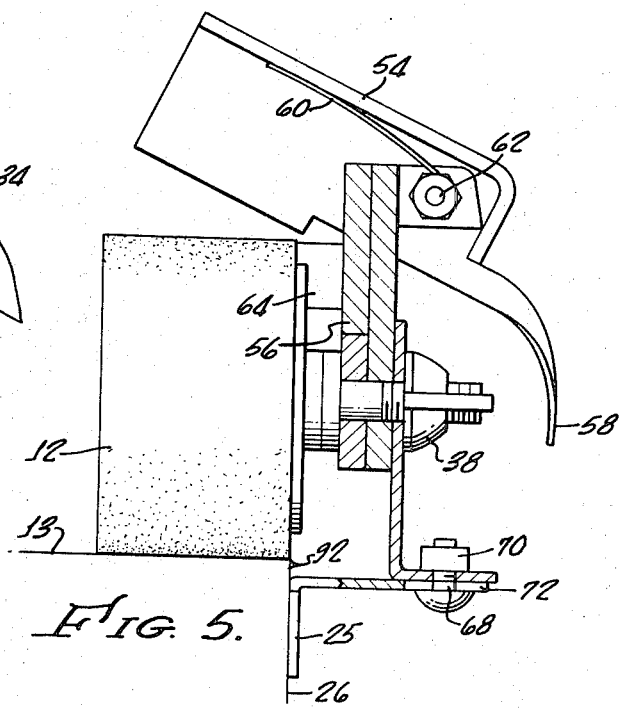
FIG. 5.
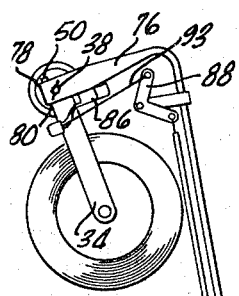
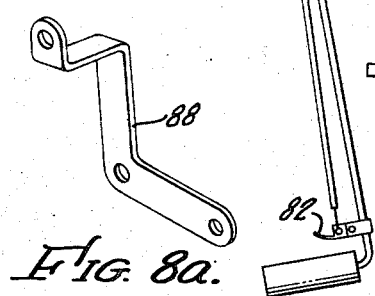
FIG. 8a.
FIG. 8.
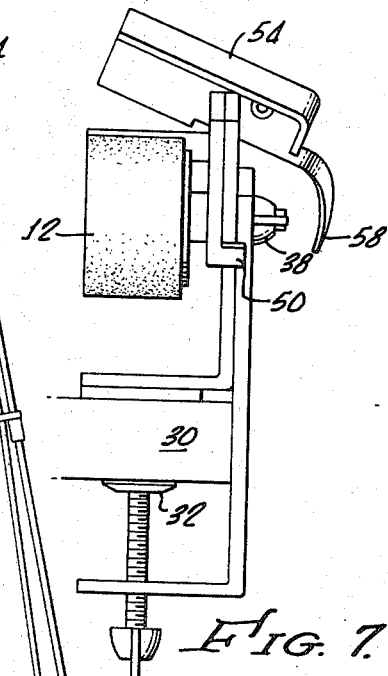
FIG. 7.
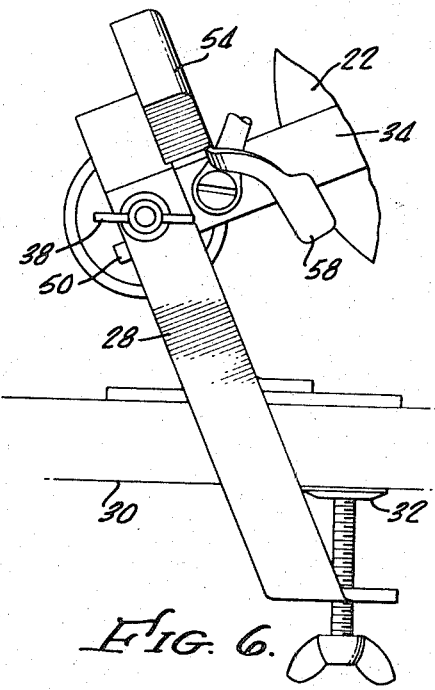
FIG. 6.
INVENTOR.
SCHUBERT W. HINDS
BY Donald W Canady
ATTORNEY.

United States Patent Office 3,547,740
Patented Dec. 15, 1970

3,547,740
PRESSURE SENSITIVE ADHESIVE TAPE
APPLICATOR
Schubert W. Hinds, 601 Lovell Place,
Fullerton, Calif. 92632
Continuation-in-part of application Ser. No. 724,511,
Apr. 26, 1968. This application Dec. 3, 1968, Ser.
No. 780,626
Int. Cl. B32b 31/18; B44c 7/02
U.S. Cl. 156—523
9 Claims

ABSTRACT OF THE DISCLOSURE

A novel pressure sensitive tape applicator of the type wherein a strip of tape is rolled from a rotatably mounted tape roll over a guide roller which presses the strip of tape onto a surface, and involves the use of a measuring bumper to determine the length of tape needed to apply the tape on the surface up to a discontinuity in the surface which is encountered by the end of the bumper. A novel scissor-type cutter is mounted on the applicator frame for actuation by a finger of the hand operating the applicator. An edge guide attachment is also provided for applying the tape evenly along a surface adjacent an edge. Adaptors are also provided for extending the length of the handle and for attaching the applicator to a bench for stationary dispensing use.

This application is a continuation-in-part application of my application Ser. No. 724,511, filed Apr. 26, 1968.

This invention relates to an improved tape applicator, and more particularly relates to an improved device for applying pressure-sensitive adhesive tape or the from a roll of said tape to a surface to be covered with said tape.

Pressure-sensitive tape may be applied to surfaces for decorative and numerous other purposes, either manually or with a tape applicator. For example, it has been the practice of painters to cover surfaces to remain unpainted with masking tape. Normally, such tape is obtained in rolls and lengths of tape are removed from the roll as needed to apply to a surface to be masked. Various attempts have been made to facilitate and mechanize the tape masking operation. Mechanization is particularly desirable to increase the speed of the masking operation and to permit greater accuracy and precision in covering that area to be masked without overlapping the adjacent area which is to be painted.

In the parent application mentioned above, a pressure sensitive adhesive tape applicator designed to apply tape from a roll of tape to a first surface which is adjacent a second surface in a different plane, is described. The tape is applied to the first surface by pushing the tape applicator forward by means of a handle with a slight pressure downwardly against the front of the tape applicator to press the tape against the surface with a roller. This applicator permits application of the tape flush on the first surface immediately adjacent the second surface, however, it is difficult to apply the tape to the entire length of the first surface where it is interrupted by an intersecting surface, such as a wall perpendicular to said second surface.

Accordingly, it is an object of my present invention to provide an improved pressure sensitive adhesive tape applicator for application of tape to a surface which is interrupted by an intersecting surface, and applies the tape precisely on said first surface up to said intersecting surface.

It is also an object of my present invention to provide a pressure sensitive adhesive tape applicator which has a measuring means for indicating the distance to a discontinuity in the surface to which the tape is being applied.

The convenience of operation of a pressure sensitive adhesive tape applicator is greatly increased if the device can be operated manually with one hand. When it is necessary to cut the tape, prior art applicators require the use of two hands. It is therefore, a further object of my present invention to provide a pressure sensitive tape applicator with an integral cutter which can be actuated with a finger of the hand used to operate the applicator.

It is also an object of my present invention to provide a cutter which can be remotely actuated from an extension handle provided to facilitate use of the applicator at arms' length or greater distance.

While the apparatus described in the aforementioned application is useful for applying tape along a surface abutting a second surface in a different plane where the second surface is an edge which does not limit the transverse movement of the applicator, it is sometimes difficult to apply the tape precisely along the edge. Accordingly, it is a further object of my present invention to provide an edge guide for a pressure sensitive tape applicator so that the tape can be applied evenly along a surface which is adjacent an edge.

It is also an object of my present invention to provide an adapter for the pressure sensitive tape applicator for use in a stationary position as a simple tape dispenser.

It is a further object of my present invention to provide a pressure sensitive adhesive tape applicator which accurately applies tape played out from a tape roll to a surface quickly and accurately.

Other objects and a more complete understanding of my present invention will become apparent from the following specification and the appended claims when taken in conjunction with the drawings wherein:

FIG. 1 is side view partially in section of the improved tape applicator of my present invention;

FIG. 2 is a plan view of the tape aplicator shown in FIG. 1;

FIG. 3 is an end view of the tape applicator as shown in FIGS. 1 and 2;

FIG. 4 is a partial side view of a tape applicator employing a modification of the applicator shown in FIGS. 1 and 3, utilizing an edge guide;

FIG. 5 is a front end view of the apparatus shown in FIG. 4;

FIG. 6 and 7 show an adaptor device for clamping the apparatus shown in FIGS. 1 through 3 to a bench; and FIG. 8 shows a tape applicator according to my present invention provided with an extension handle and a remote cutter actuator; and FIG. 8a is an enlarged fragmental view of FIG. 8.

Briefly described, my invention, as embodied in the tape applicator shown in FIGS. 1 and 2, involves the use of a measuring bumper 20 on a tape applicator 10 which is generally of the type described in my aforementioned parent application. The distance between the point of contact 11 between the roller 12 and the surface 13 to the end 14 of the bumper 20, is equal to the length of tape between the point of contact 11 and the cutter edge 16 so that when taping the surface 13, the operator need only tape until the bumper 20 touches the intersecting surface or wall 18. When the cutter is actuated, the exact amount of tape to reach up to the edge of the wall 18 will be cut from roll 22. FIGS. 4 and 5 show an improvement to the tape applicator to permit application of the tape along the edge of a first surface by the use of an edge guide 24 which engages the edge of a second surface 26 as best shown in FIG. 5. The extension handle shown in FIG. 8 permits use of the tape applicator in a remote surface or along the floor from a walking position. The adapter device 28 shown in FIGS. 6 and 7 show means for using the tape applicator on a bench 30 through the use of a clamp device 32.

Referring now more particularly to the apparatus shown in FIGS. 1 and 2, the tape applicator 10 comprises a frame member 34 which carries parallel axles 36 and 38 upon which are rotatably mounted respectively, a wheel 40 for carrying a roll of masking tape 22, and a wheel 42 which carries a roller guide 12. A strip of tape 44 is played out from the roll 22 so that the tacky side is laid adjacent the surface 13 to which the tape is applied. The nontacky side contacts the roller 12 and is rolled around the guide roller 12 as best shown in FIG. 1, as the tape applicator 10 is pushed forward with handle 46. As viewed in FIG. 1, the roller wheel 12 rotates counterclockwise on its axle 38 and the tape wheel rotates clockwise about its axis 36.

The bumper 20 may be mounted along the frame 34 at any convenient position, although preferably it is mounted near the front of the frame 34 such as by attachment to the front roller axle 38 and secured in place with a wing nut 48. Rotation of the bumper member 20 on the axle 38 is prevented by the lug 50 on the applicator frame 34 when the wing nut 48 is hand tightened. The bumper 20 as shown in FIGS. 1 and 2 consists of a flat rigid member 52 apertured to receive the axle 38, and a flexible member 21 which fits over the outer extension of the member 52. Preferably, the bumper member 20 extends directly in front of the path of the tape being applied in the surface, as best shown in plan view FIG. 2. When the bumper is not needed, it may be rotated by loosening the wing nut 48, to the position shown in the phantom line in FIG. 1.

A cutter 54 is mounted on the frame 34 so that the cutting edge 16 will sever the tape between the front roller 12 and the tape roll 22. The length of the bumper 20 is such that the distance from the point of contact 11 between the roller and the surface, to the end 14 of the bumper 20, is equal to the length of tape between the point 11 and the point where the edge 16 of the cutter 54 severs the strip of tape 44.

The cutter 54 is preferably of the scissor type. For convenience, the cutter frame 56 may also be attached to the frame 34 of the tape applicator by mounting on the front roller axle 38. The top cutting edge 54 of the cutter may be actuated by the index finger of the hand gripping handle 61, to move the cutter trigger 58 outwardly. The trigger 58 is positioned proximate the handle 61 to permit such index finger actuation. The cutting edge 16 is retracted upwardly (and handle 58 retracted inwardly) by a spring 60 (FIG. 3) which is mounted on the pivot axle 62 of the cutter 16. The lower cutting edge 64 is stationary with respect to the upper cutting edge 16 and is held for cutting purposes by the handle 61 through its attachment to frame 34.

I have described my cutter with reference to attachment means to the axis of the front roller. It is readily apparent, however, that the cutter may be attached directly to the frame 34.

The edge guide 24 shown in FIGS. 4 and 5 may also be conveniently attached to the applicator frame 34 by an arm 66 which is mounted on the axle 38 of the front roller 12. The guide arm 25 is adjustable with respect to the tape applicator roller 12 by attachment of the guide arm 25 to the member 66 with a screw 68 and bolt 70 arrangement through an adjustable slot 72 extending upwardly from the guide arm 25. Thus, the guide 25 can be moved horizontally by loosening the nut 70.

As shown in FIGS. 5 and 6, the tape applicator 10 may be mounted on the clamp attachment 28 at the axle 38 in the front roller 12 and the lower end of the adapter 28 may be mounted on bench 30 with an adjustable clamp 32. With the tape applicator so mounted, the applicator may be used as a bench tape dispenser with the cutter 54 providing means for severing lengths of tape from the roll.

FIG. 8 shows the embodiment of my present invention wherein the applicator 10 has an extension arm 74 fastened to the frame 34. Again the extension handle 74 may be attached to the axle 38 of the front roller, as shown in FIG. 8, and the rotation of the extension arm member 76 on the axle 38 prevented by engagement with the lug 50 on the frame member 34. The bottom end 78 of the frame arm 76 is bent approximately 90° to engage the bottom edge 80 of the frame 34 to assist in preventing rotation of the extension arm 78 on the axle 34, while the applicator 10 is being used with extension arm, the cutter 54 may be actuated remotely with the trigger 82 by a suitable linkage 84 to the cutter actuator 58. A shoe 86 is provided to attach the linkage 84 to the cutter actuator 58 and a toggle connector 88 is provided to move the cutter arm 58 outwardly with the shoe 86 to actuate the cutter. Cables 91 and 93 are swivelly mounted between trigger 82 and one end of toggle connector 88, and between the other end of the toggle and shoe 86, respectively. The shoe end 89 of the toggle is bent outwardly as shown in FIG. 8a so that pulling trigger 82 pulls cable 93 upwardly in approximately the plane defined by the path of trigger 58. Hence, the angle of the end of the toggle arm is approximately perpendicular to the plane the trigger 58 defines in motion.

In operation, the apparatus of my present invention may be used to apply tape to a surface 13 evenly along edge 26 flush up to the wall 18 by use of a measuring bumper 20. As the tape applicator is moved to the left in FIG. 1 until the bumper 20 engages the wall 18, the cutter mechanism 54 is actuated by moving the cutter handle 58 outwardly to sever the tape roll 44. The actuator can then be removed and the cut portion of the tape manually applied to the surface 13 right up to the wall 18 as shown at 90 of FIG. 1. The edge of the guide arm 25 guides the edge of the tape along the outer edge 92 of the surface 13 or any other predetermined distance from the edge 92 which is parallel to the edge 26 by adjustment of the guide arm 25 along slot 72.

While my present invention has been described in detail with respect to the preferred embodiment, it is to be understood that my invention is not limited to the details given but should be afforded the full scope of the appended claims.

I claim:

1. A tape applicator for applying pressure sensitive adhesive tape from a roll wherein a frame member is provided with front and rear spaced apart parallel axles, and a first wheel is rotatably mounted on said rear axle and adapted to carry said tape roll in frictional engagement therewith, and a second wheel is rotatably mounted on said front axle for guiding tape paid out from said roll around said second wheel and onto a surface and for applying said tape to said surface;

and wherein said frame member is provided with a handle portion for guiding said applicator, the improvement comprising: means for cutting a strip of said paid out tape at a point between said roll and the point of first contact with said second wheel, a measuring bumper extending forwardly from said second wheel, the distance from the contact point where said second wheel contacts said surface, to the end of said bumper, being equal to the length of said paid-out tape between said contact point and said cutting point.

2. The apparatus of claim 1 wherein said cutting means is a scissor-type cutter affixed to said frame for actuation by a trigger proximate said handle, said cutter engaging said tape only to cut said tape.

3. The apparatus of claim 2 wherein said trigger is positioned relative to said handle for finger actuation by the hand operatively engaging said handle.

4. The apparatus of claim 1 wherein said bumper extends forwardly in the path to which said tape is being applied, said bumper having a section thereof wherein the axis of said bumper is flexible and said bumper has sufficient resilience to maintain said axis normally straight after said section is flexed.

5. The apparatus of claim 1 including means for laterally guiding said applicator along an edge of said surface to apply said tape parallel to said edge.

6. The apparatus of claim 5 wherein said guiding means permits application of said tape to said surface on a path spaced from said edge, and including adjustable means for setting the distance between said edge and said path.

7. The apparatus of claim 1 including an extension arm for operating said applicator and means connectible to said trigger for remotely actuating said trigger from the end of the extension arm remote from said applicator.

8. The apparatus of claim 7 wherein said extension arm is attachable to said front axle and fixedly positioned with respect to said frame with an interlocking lug.

actuating means includes a toggle arm, the upper end

9. The apparatus of claim 7 wherein said remote actuating means includes a toggle arm, the upper end of which is moved by a cable actuator and the other end of which is adapted to swiveally mount a cable operably connected to said cutter trigger for actuation of said cutter by said cable actuator.

References Cited
UNITED STATES PATENTS

| | | | |
|---|---|---|---|
| 1,472,735 | 10/1923 | Pizzino | 156—526X |
| 2,606,682 | 8/1952 | Cutter | 156—523 |
| 2,999,609 | 9/1961 | Thompson | 156—527 |
| 3,156,602 | 11/1964 | Fritzinger | 156—523 |
| 3,326,738 | 6/1967 | McLaughlin | 156—577X |
| 3,389,040 | 6/1968 | Fritzinger | 156—577X |

BENJAMIN A. BORCHELT, Primary Examiner

J. M. HANLEY, Assistant Examiner

U.S. Cl. X.R.

156—577